United States Patent [19]

Saitou

[11] 4,030,135

[45] June 14, 1977

[54] DUAL CASSETTE TAPE RECORDER

[75] Inventor: Sinichi Saitou, Ishikawa, Japan

[73] Assignee: Olympus Optical Co., Ltd., Tokyo, Japan

[22] Filed: Nov. 17, 1975

[21] Appl. No.: 632,861

[30] Foreign Application Priority Data

Nov. 20, 1974 Japan .................. 49-133459
Nov. 20, 1974 Japan .................. 49-140410[U]

[52] U.S. Cl. .................. 360/94; 360/96; 360/105

[51] Int. Cl.² .................. G11B 23/04; G11B 21/12

[58] Field of Search .......... 360/94, 96, 105, 88, 360/93; 242/190–200, 180–181; 179/100.11

[56] References Cited

UNITED STATES PATENTS

| | | | |
|---|---|---|---|
| 3,489,417 | 1/1970 | Harper | 360/94 |
| 3,524,651 | 8/1970 | Ketzer | 360/93 |
| 3,531,127 | 9/1970 | Harper | 179/100.11 |
| 3,632,894 | 1/1972 | Bretschneider | 179/100.11 |
| 3,777,073 | 12/1973 | Kokubo | 360/94 |
| 3,864,743 | 2/1975 | Staar | 360/94 |
| 3,922,719 | 11/1975 | Negishi | 360/88 |

Primary Examiner—Alfred H. Eddleman
Attorney, Agent, or Firm—Ostrolenk, Faber, Gerb & Soffen

[57] ABSTRACT

A dual cassette tape recorder comprises a cassette receiving means adapted to receive either a compact tape cassette or microtape cassette. The cassette receiving means is associated with a capstan and a pinch roller adapted to engage and drive a tape in the compact cassette, and with a pair of a capstan and a pinch roller adapted to engage and drive a tape in the microcassette. Drive means is provided for driving the both capstans. An interlocking lever is provided which detects a displacement of the pinch roller associated with the compact cassette during a recording or playback operation for operating the pinch roller associated with the micro-cassette, thus permitting a satisfactory recording or playback operation when either type of cassette is mounted in the cassette receiving means.

20 Claims, 9 Drawing Figures

DUAL CASSETTE TAPE RECORDER

BACKGROUND OF THE INVENTION

The invention relates to a dual cassette tape recorder which is adapted to be used with either compact cassette or micro-cassette.

The term compact cassette is defined herein as a cassette which is typically exemplified by a width of 63.8mm, a length of 100.4mm and a thickness of 12.0mm while the term micro-cassette refers to a tape cassette of a size which is typically on the order of 50.0mm long, 33.0mm wide and 8.0mm thick.

Both kinds of tape cassettes have been used with respective dedicated tape recorders, but with the widespread use of tape recorders, it is desirable to provide a tape recorder capable of receiving either one of the two types. To achieve this end, it is necessary to provide two pairs of capstans and pinch rollers in the tape recorder which are associated with the respective types of tape cassettes. Each pair of capstan and pinch rollers must maintain such a spatial relationship therebetween or abutting relationship with the tape that an optimum and uniform operating condition is established with respect to either type of tape cassette. However, there has been no such dual cassette tape recorder available which satisfies these requirements.

SUMMARY OF THE INVENTION

It is an object of the invention to provide a novel dual cassette tape recorder capable of providing satisfactory performance with either compact or micro-cassettes by the provision of two pairs of pinch rollers and capstans which are arranged at optimum positions and interlocked with each other.

DETAILED DESCRIPTION OF EMBODIMENTS

Figure 1:
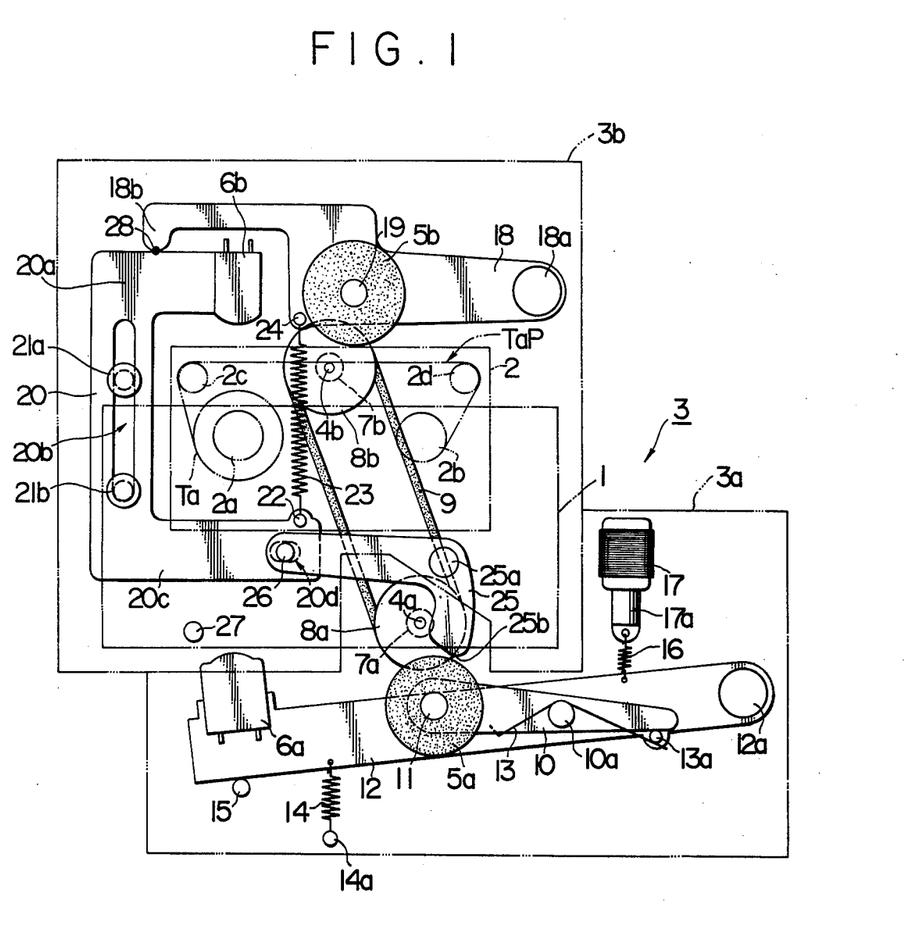
FIG. 1 is a plan view of a drive unit of a tape recorder which is constructed in accordance with one embodiment of the invention.

Referring to FIG. 1, there is shown a compact cassette 1 and a micro-cassette 2, both in phantom lines, which may be selectively loaded into a drive apparatus 3 of a tape recorder. Specifically, the apparatus 3 includes a compact cassette drive unit 3a and a micro-cassette drive unit 3b, both shown in blocks indicated by phantom lines, and each of the drive units 3a, 3b include a capstan 4a, 4b, a pinch roller 5a, 5b and a magnetic head 6a, 6b. It is to be noted that the compact cassette 1 is loaded into the drive apparatus 3 in an orientation such that its open lateral edge, in which a member of tape access openings are formed, faces the downward direction, as viewed in this Figure, while the microcassette 2 is loaded with its open lateral edge facing the upward direction.

Figure 1A:
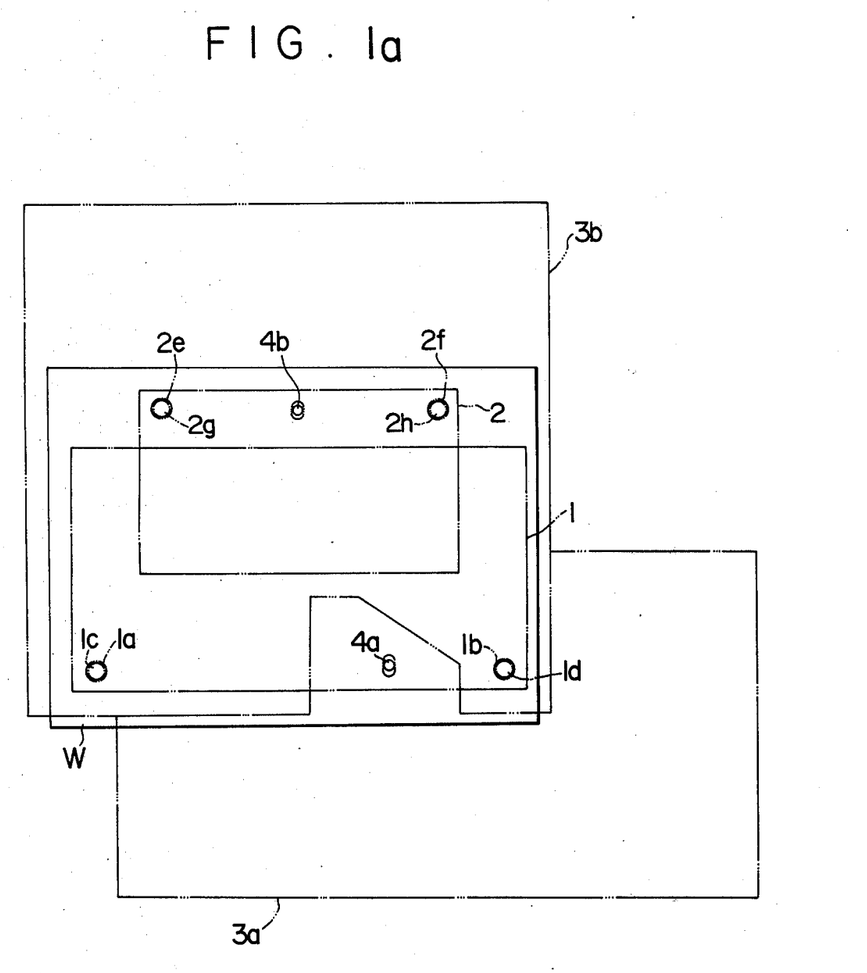
FIG. 1a is a schematic view of the positioning pins which locate the respective cassettes.

As shown in FIG. 1a, the compact cassette 1 is provided with a pair of positioning apertures 1a and 1b, which are engaged by stationary positioning pins 1c and 1d when this cassette is loaded into a cassette receiving window W of the tape recorder. Similarly, the micro-cassette 2 is provided with a pair of positioning apertures 2e and 2f, which are engaged by stationary positioning pins 2g and 2h when this cassette is loaded into the cassette receiving window W. The various members of the drive unit 3b are arranged and supported in a conventional manner so as to maintain the relative position with the micro-cassette 2 as shown in FIG. 1.

In the apparatus 3, the compact cassette 1 and the micro-cassette 2 combined with its associated drive unit 3b, exclusive of the capstan 4b, constitutes together an adapter so that the drive unit 3a, which is designed to operate when its associated compact cassette 1 is loaded, is also operable to drive the drive unit 3b when the compact cassette 1 is replaced by the micro-cassette 2. Specifically, the capstans 4a, 4b are fixedly mounted on a pair of shafts 7a, 7b, which have a pair of pulleys 8a, 8b fixedly mounted thereon, and an endless closed loop belt 9 is entrained around the pair of pulleys to provide an operative connection therebetween. The pulley 8a is driven by a drive motor, not shown, when a recording or playback operation is to be performed, rotating the pulley 8b through the endless belt 9 and thus rotating the capstans 4a, 4b in unison. While the drive unit 3b is detachably mounted on the apparatus 3 as an adaptor, the capstan 4b is not removable in view of such operative connection between the capstans 4a and 4b.

Describing the arrangement of the invention in more detail, the capstan 4a is located opposite to the pinch roller 5a, rotatably mounted on a pin 11 which is fixed on the end of one arm of a pinch roller holder 10, which is in turn pivotally mounted on a pin 10a fixedly attached to a magnetic head support 12. A torsion spring 13 disposed on the pin 10a has one end engaging holder 10 adjacent to pinch roller 5a and has the other end engaging a stationary pin 13a which is fixedly mounted on the support 12, thus urging the holder 10 to rotate clockwise about the pin 10a so that its other arm bears against the pin 13a. One end of the magnetic head support 12 is pivotally mounted at 12a, and a magnetic head 6a is fixedly mounted on its free end. A coiled spring 14 has one end engaging a stationary pin 14a and the other end, engaging the support 12 adjacent to the magnetic head 6a, thus urging the support 12 to rotate counter-clockwise about the pin 12a. However, such movement of the support 12 is limited by its abutment against a stationary stop pin 15. Adjacent to the pivot 12a, the support 12 is engaged by one end of a coiled spring 16, the other end of which is secured to an armature 17a of an electromagnet 17 which is disposed above the support 12, as viewed in FIG. 1.

When the micro-cassette 1 and its drive unit 3b, which together form an adaptor, are removed and the compact cassette 1 is loaded, and the tape recorder is manually set for either a recording or playback operation, the electromagnet 17 is energized to attract the magnetic head support 12, whereby the pinch roller 5a is moved into abutting engagement against the capstan 4a and the magnetic head 6a is also moved into abutting engagement against a magnetic tape, not shown, which is contained within the compact cassette 1. The magnetic tape is fed through the nip between the capstan 4a and the pinch roller 5a while performing a recording or playback operation by means of the magnetic head 6a.

When the compact cassette 1 is removed from the drive apparatus 3, the micro-cassette 2 can be loaded into the apparatus 3 together with its associated drive unit 3b. The micro-cassette 2 includes a pair of tape hubs 2a, 2b and a pair of guide rollers 2c, 2d. A magnetic tape Ta having its one end secured to one of the hubs, 2a, is reeled off to extend along a tape passage TaP extending between the pair of guide rollers 2c, 2d while bearing against the capstan 4b, and its other end is secured to the other hub 2b. As shown, the tape passage TaP extends in the horizontal direction.

Referring to FIG. 1, the pinch roller 5b is located opposite to the capstan 4b, and is rotatably mounted on a pin 19 which is fixedly mounted on a rocker 18 intermediate its ends. At its one end, the rocker 18 is pivotally mounted on a pivot 18a, and is angularly movable to traverse across the tape passage TaP. At its free end, the rocker 18 is provided with an abutment 18b, which bears against an upper edge of an upper arm 20a of a channel-shaped slide 20, which is formed in its base portion with an elongate slot 20b extending in a direction perpendicular to the length of the tape passage TaP, which slot is engaged by a pair of stationary headed pins 21a and 21b so as to permit a sliding movement of the rocker 18 in a direction to traverse across the tape passage TaP. The upper arm 20a extends horizontally to the right horizontally, as viewed in FIG. 1, and a magnetic head 6b is fixedly mounted on the free end thereof. The slide 20 also includes a lower arm 20c which extends in a direction parallel to the upper arm 20a, and its free end carries a pin 22 which is engaged by one end of a coiled spring 23, the other end of which engages a pin 24 fixedly mounted on the rocker 18 at a position adjacent to and to the left of the pinch roller 5b, thus resiliently connecting the rocker 18 and the slide 20 together. It should be understood that the coiled spring 23 may be replaced by other suitable resilient member.

At its free end, the lower arm 20c of the slide 20 is formed with an elongate slot 20d, which is engaged by a pin 26 fixedly mounted on the end of one arm of an interlocking lever 25 which is in turn pivotally mounted at 25a. The other arm of the lever 25 has an abutment 25b which is located on the path of movement of the pinch roller 5a when the micro-cassette adaptor is loaded into the tape recorder.

Assuming that the adaptor comprising the micro-cassette 2 and its associated drive unit 3b is loaded into the drive apparatus 3 and the tape recorder manually set for a recording or playback operation, the electromagnet 17 is energized in the same manner as when the compact cassette 1 is loaded, thus attracting the magnetic head support 12. However, since the abutment 25b of the interlocking lever 25 is located on the path of movement of the pinch roller 5a, the latter bears against the abutment 25b and cannot be moved into abutting engagement against the capstan 4a.

Figure 2:
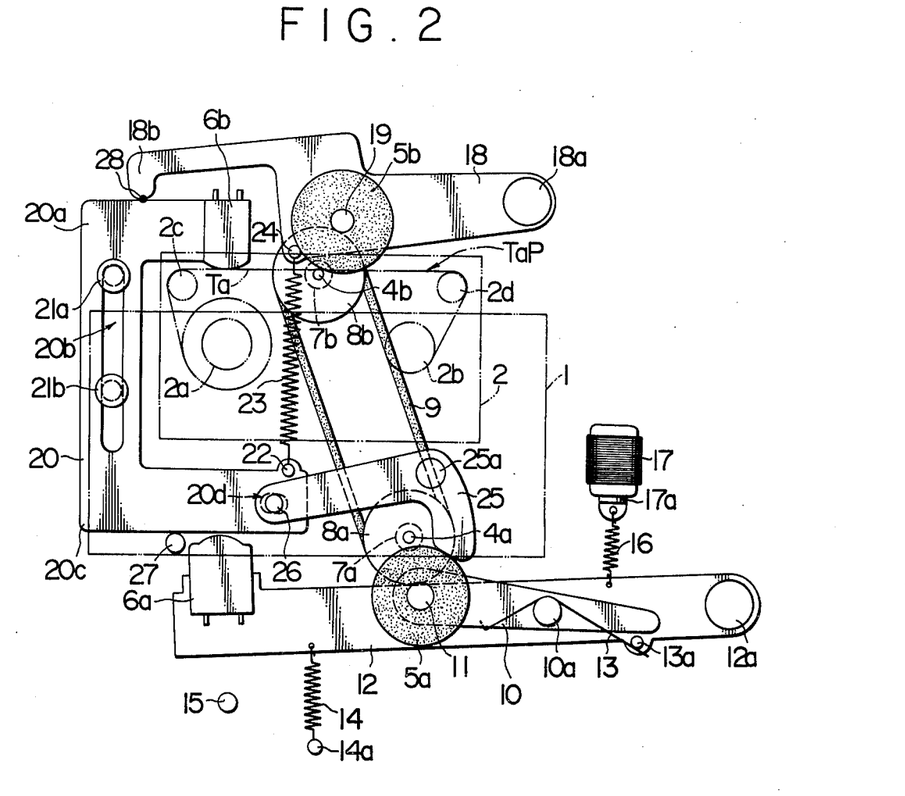
FIG. 2 is a plan view of the apparatus shown in FIG. 1 in one of its operative positions.

As the pinch roller 5a bears against the abutment 25b of the interlocking lever 25, the latter is rotated counterclockwise about the pivot 25a, whereby the pin 26 carried thereon causes the slide 20 to be displaced in the downward direction, as viewed in FIG. 1. Thereupon, the slide 20 moves downward until the lower edge of the lower arm 24 bears against a stationary pin 27, thus bringing the magnetic head 6b mounted on the upper arm 20a into abutting relationship with the magnetic tape Ta, as illustrated in FIG. 2. This displacement of the slide 20 causes the rocker 18 to be rocked in a corresponding manner under the action of the coiled spring 23, whereby the pinch roller 5b is brought into abutting engagement against the capstan 4b, as shown in FIG. 2. As a result, the magnetic tape Ta is fed by the cooperation of the capstan 4b and the pinch roller 5b, while performing a recording or playback operation by means of the magnetic head 6b.

Figures 3, 4:
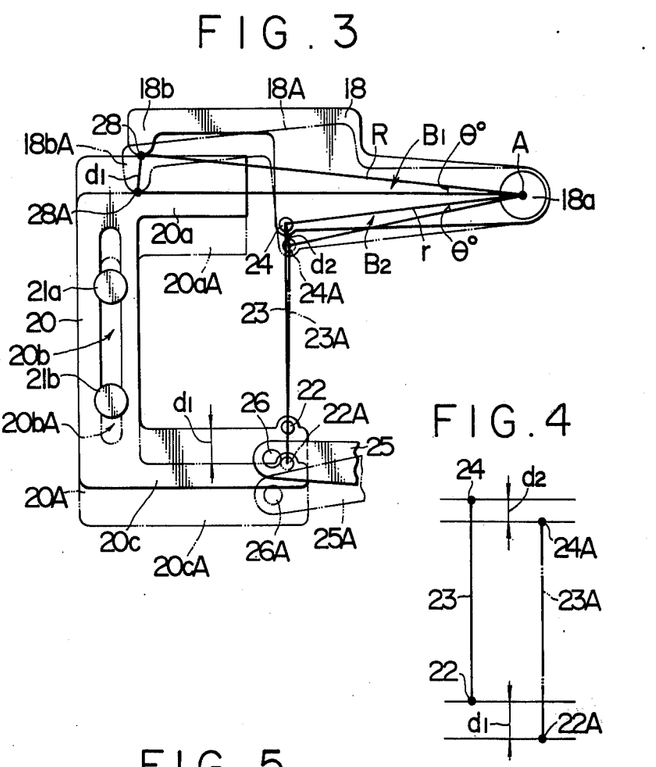
FIG. 3 is a schematic view illustrating the operation of a coiled spring used in the present invention.
FIG. 4 is a diagram illustrating the elongation of the coiled spring.

The operation of the coiled spring 23 will be more fully described with reference to FIGS. 3 and 4. In FIG. 3, the initial positions of the various members are shown in solid line while their position after the displacement has taken place are shown in phantom lines and designated by the corresponding reference numerals followed by a letter A. Thus, when the interlocking lever 25 has been displaced to a position 25A shown in phantom lines, the pin 26 will be displaced to a position 26A shown in phantom lines and the slide 20 will be displaced to a position 20A also shown in phantom lines. The displacement of the slide, as represented by a movement of the lower arm 20c, is designated by $d_1$. When the slide 20 is displaced, the rocker 18 moves angularly to a position 18A shown in phantom lines, and this angular displacement of the rocker 18 is designated by $\theta°$. A point of contact 28 between the abutment 18b of the rocker 18 and the upper arm 20a of the slide 20 will be displaced to a point 28A, and the displacement of this point will be very close to the displacement $d_1$ of the slide 20 and hence is assumed to be equal thereto. The pin 22 on the lower arm 20c of the slide 20 which is engaged by one end of the coiled spring 23 will be displaced to a position 22A shown in phantom lines, and such displacement will be equal to the displacement $d_1$ of the slide 20.

The displacement of the pin 24 on the rocker 18 which is engaged by the other end of the coiled spring 23 (shown by a rectilinear line) to a phantom line position 24A is designated by $d_2$, the center of the pivot 18a of the rocker 18 by A, the distance from the point A to the point of contact 28 by R, and the distance from the point A to the pin 24 by r, it will be appreciated that a triangle $B_1$ formed by joining the point A, the point of contact 28 and its displaced point 28A, and a triangle $B_2$ formed by joining the point A, the pin 24 and its displaced position 24A are isosceles triangles having an equal apex angle of $\theta°$ and hence are homologous to each other.

Thus $$d_1 : d_2 = R : r \tag{1}$$

On the other hand, representing the elongation of the coiled spring 23, as it is extended to assume a position 23A in response to the displacement of the slide 20 and the rocker 18, by S, it will be seen from FIG. 4 that neglecting any slight error, $$S = d_1 - d_2 \tag{2}$$

Rewriting the equation (1), $$d_2 = r/R \, d_1 \tag{3}$$

Substitution of the equation (3) into the equation (2) and rearranging yields:

$$S = R-r/R \, d_1 \tag{4}$$

Thus, it will be seen that in response to a displacement of the slide 20 which is caused by the interlocking lever 25, the coiled spring 23 will be elongated by an amount S indicated by the equation (4) from its initial condition to thereby exert a resilience which brings the pinch roller 5b into abutting relationship with the capstan 4b and that whenever the interlocking lever 25 ceases to be driven externally, the spring 23 will contract by the amount S to return the slide 20 and the rocker 18 to their stable position or the initial position shown in FIG. 1.

Figure 5:
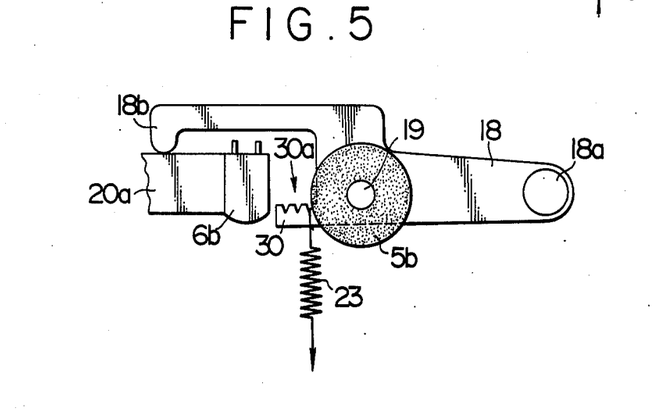
FIG. 5 is a plan view of a rocker, illustrating the position of an engaging arm.

As will be apparent from the equation (4), the greater the displacement of the slide, the greater the amount of rotation of the rocker or the distance between the point 28 and the pin 24, the higher the value of the elongation S of the coiled spring 23 which can be achieved. In this connection, FIG. 5 shows an example of the rocker 18 which is formed with an extension in the form of an engaging arm 30 which replaces the pin 24 so that the position for engagement with the coiled spring 23 may be adjusted along a saw-toothed edge 30a. In this manner, an optimum value of elongation S of the coiled spring 23 can be chosen in accordance with the relationship between the capstan 4b and the pinch roller 5b.

In this embodiment, the single coiled spring 23 can be utilized to provide an interlocked operation of the slide 20 and the rocker 18, so as to easily locate the magnetic head 6b and the pinch roller 5b at respective operative positions with respect to the magnetic tape Ta. When the pinch roller 5b bears against the capstan 4b with a pressure of 200 grams, it is sufficient that the coiled spring 23 has a resilience to supply the same magnitude of the pressure, so that an inexpensive coiled spring may be used for the spring 23, and related parts may have a reduced strength.

Figure 6:
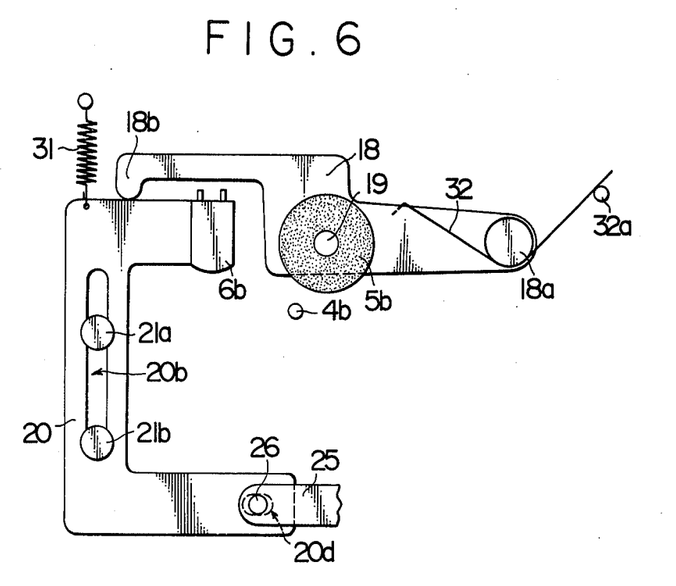
FIGS. 6 to 8 are plan views of other embodiments of the drive unit which is used in the tape recorder according to the invention.
Figure 7:
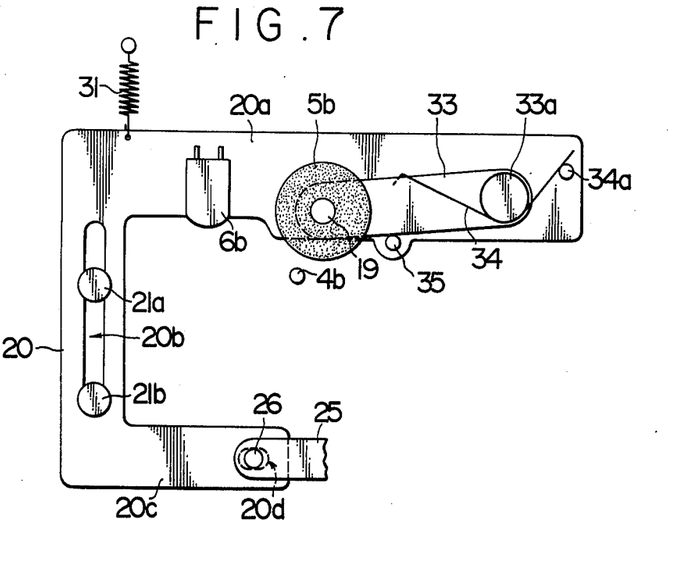

FIG. 6 shows an apparatus according to the invention in which the slide 20 is urged by a coiled spring 31 and the rocker 18 is urged by a torsion spring 32 disposed around the pivot 18a and which has its other end engaged with a pin 32a. When the pinch roller 5b bears against the capstan 4b with a pressure of 200 grams, it is necessary that the coiled spring 31 has a resilience which supplies a pressure as high as 300 grams. FIG. 7 shows a different arrangement of the apparatus according to the invention in which the upper arm 20a of the slide 20 rotatably carries a pinch roller holder 33 on a pivot 33a. A stud 19 fixedly mounted on the holder 33 rotatably carries the pinch roller 5b, and the holder 33 is urged by a torsion spring 34 so that the pinch roller 5b is urged into abutting engagement with the capstan 4b until the holder bears against a stop 35 on the upper arm 20a. The torsion spring 34 is disposed around the pivot 33a and has its other end engaged with a pin 34a. When the pinch roller 5b is to bear against the capstan 4b with a pressure of 200 grams, the coiled spring 31 must supply a pressure of 250 grams.

Figure 8:
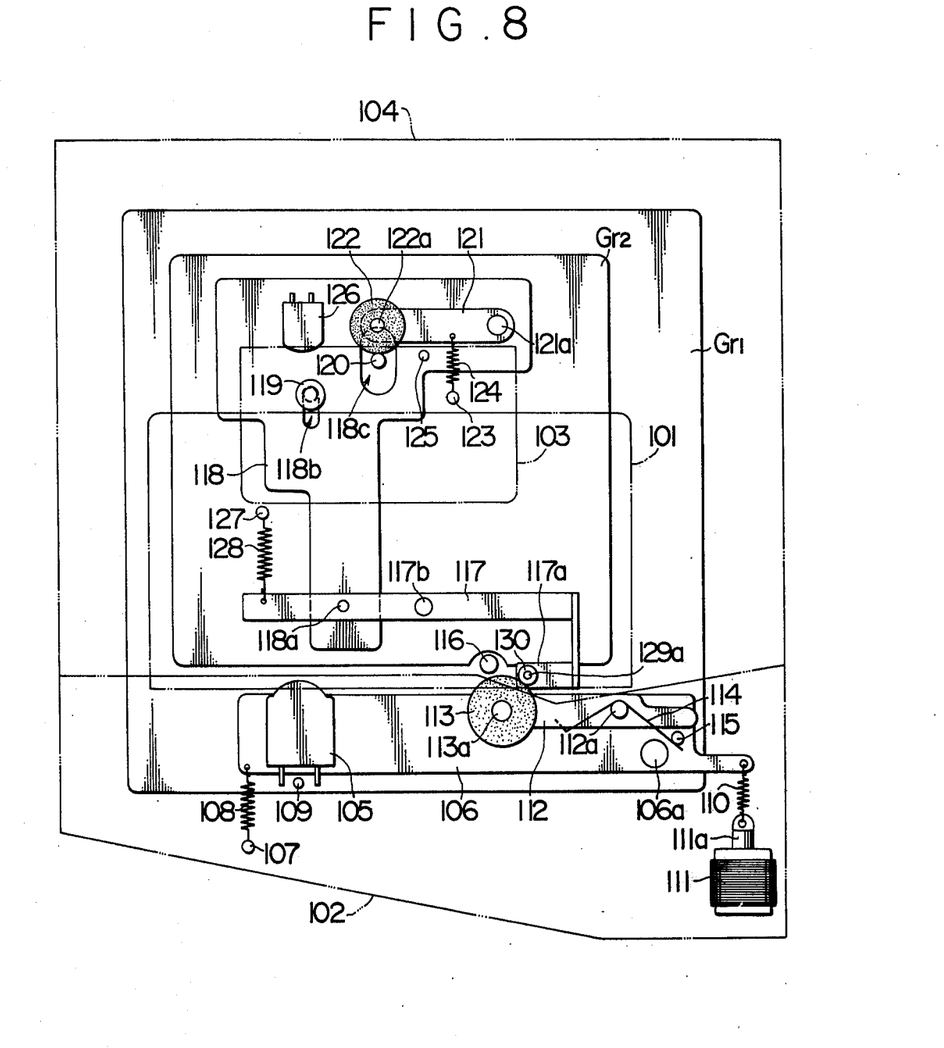

FIG. 8 shows a further embodiment of the present invention. A compact cassette 101, shown in phantom lines, is adapted to be driven by a drive 102 which is assembled into the tape recorder and which is indicated in a block encircled by phantom lines.

When the compact cassette 101 is removed and replaced by a micro-cassette 103, shown in phantom lines, the micro-cassette 103 and its associated drive 104 shown in a block encircled by phantom lines form a cassette adaptor which is loaded into the tape recorder.

In the compact cassette drive unit 102, a magnetic head 105, adapted to cooperate with a compact cassette is fixedly mounted on the left-hand end of a magnetic head support lever 106 rotatably mounted on a pin 106a which is in turn fixedly mounted on a base plate $Gr_1$. One end of the lever is engaged by one end of a coiled spring 108 which has its other end engaging stationary pin 107, whereby the support lever 106 is urged to rotate counter-clockwise about the pin 106a. However, the rotation of the support lever 106 is constrained by abutment against a stationary pin 109. The right-hand end of the support lever 106 is connected with an actuator of an electromagnet 111 through a coiled spring 110. Adjacent to the pin 106a, a pin 112a is fixedly mounted on the support lever and rotatably carries a pinch roller holding lever 112, the left-hand end of which fixedly carries a pin 113a thereon which rotatably carries a pinch roller 113 for cooperation with the tape contained in a compact cassette. A torsion spring 114 is disposed around the pin or pivot 112a of the holding lever 112, has one end engaging holding lever 112 and the other end engaging a pin 115 fixedly mounted on the support lever 106, thus urging the holding lever 112 to rotate clockwise about the pin 112a. However, the rotation of the holding lever 112 is constrained by abutment against pin 115. The pinch roller 113 is adapted to cooperate with a capstan 116 for the compact cassette which is mounted on the base plate $Gr_1$.

When the micro-cassette 103 and its associated drive unit 104 are not loaded and instead the compact cassette 101 is loaded, and the tape recorder is manually set for a recording or playback operation, the electromagnet 111 is energized, causing the magnetic head support lever 106 to rotate clockwise against the resilience of the coiled spring 108. As the support lever 106 rotates, the pinch roller 113 is brought into abutting engagement against the capstan 116, and the magnetic head 105 is moved into abutment against a magnetic tape (not shown) contained within the compact cassette 101. Thus, the magnetic head is fed by the cooperation of the capstan 116 and the pinch roller 113 while performing a recording or playback operation by means of the magnetic head 105.

When the compact cassette 101 is removed and instead the micro-cassette 103 and its associated drive unit 104 are loaded, a pinch roller detector 117a which is located on the end of the right-hand arm of an interlocking lever 117 contained in the drive unit 104 is positioned on the path of movement of the compact cassette pinch roller 113. When the electromagnet 111 is energized under this condition, the pinch roller 113 bears against the detector 117a as shown, and is prevented from abutting engagement against the capstan 116. The interlocking lever 117 is rotatably mounted on a pin 117b which is fixedly mounted on a support plate $Gr_2$, and has its left-hand arm interconnected with the lower portion of a slide 118 by means of a stud 118a. The slide 118 is centrally formed with a slot 118b which is elongate in the vertical direction and which is engaged by a headed pin 119 fixedly mounted on the support plate $Gr_2$, thus enabling a sliding movement of the slide 118 in the vertical direction relative to the support plate $Gr_2$. Toward its center, the slide 118 is formed with another elongate slot 118c, through which extends a micro-cassette capstan 120 which is mounted on the base plate $Gr_1$, the capstan 120 extending through an opening (not shown) formed in the support plate $Gr_2$. The capstan 120 is maintained in engagement with a micro-cassette pinch roller 122 which is rotatably mounted on a pin 122a fixedly mounted on a holding lever 121. The holding lever 121 is pivotally mounted at 121a on the slide 118, and is urged by a coiled spring 124, which has its other end engaged with a pin 123 on the support plate $Gr_2$, to rotate counter-clockwise about the pivot 121a. In this manner, the pinch roller 122 is urged into abutting engagement with the capstan 120 under the resilience of the coiled spring 124. However, the rotation of the holding lever 121 is constrained by abutment against a pin 125 which is fixedly mounted on the slide 118.

A micro-cassette head 126 adapted to cooperate with a tape contained in a micro-cassette is fixedly mounted on the slide 118 at a position to the left of the pinch roller 122, a viewed in FIG. 8. The end of the left-hand arm of the interlocking lever 117 is engaged by one end of a coiled spring 128 which has its other end engaged with a pin 127 fixedly mounted on the support plate $Gr_2$, whereby the interlocking lever 117 is urged to rotate clockwise about the pivot 117b and to move the slide 118 in the upward direction, as viewed in this Figure. The detector 117a of the interlocking lever 117 fixedly carries a pin 129a on which a roller 130 is rotatably mounted for abutting engagement with the pinch roller 113.

When the tape recorder is manually set for a recording or playback operation with the micro-cassette 103 and its associated drive unit 104 loaded, the electromagnet 111 is energized, rotating the magnetic head support lever 106 clockwise about the pivot 106a. As the support lever 106 rotates, the pinch roller 113 moves into abutment against the roller 130, whereby the interlocking lever 117 is rotated counter-clockwise about the pin 117b. In FIG. 8, the pinch roller 113 is shown in a position in which it has driven the roller 130. Under this condition, the slide 118 is moved downward whereby the micro-cassette pinch roller 122 is brought into abutment against the capstan 120, and the magnetic head 126 is brought into abutment against a magnetic tape (not shown) which is contained in the micro-cassette 103. The magnetic tape is fed by the capstan 120 and the pinch roller 122 while cooperating with the magnetic head 126 to perform a recording or playback operation. The capstan 120 is operatively connected with the compact cassette capstan 116, and is driven by a drive motor (not shown).

If for some reason the compact cassette pinch roller 113 bears against the capstan 116 under this condition, the pinch roller 113 is also driven for rotation by the capstan 116. In this instance, the direct abutment of the detector 117a against the pinch roller 113 will have an adverse influence upon the capstan drive system as a result of the detector 117a serving as a braking member. However, in the present embodiment, the pinch roller 113 bears against the rotatable roller 130, which presents no resistance to the rotation of the pinch roller. Instead, a component of force from the pinch roller 113 which drives the interlocking lever is effectively derived, which is favorable to the detecting operation of the interlocking lever 117.

While in the embodiments described above, the micro-cassette and its associated drive unit are formed as an adaptor, it should be understood that the drive unit and means for receiving the micro-cassette may be assembled into a tape recorder.

What is claimed is:

1. A dual cassette tape recorder including:
   1. a primary recorder comprising:
      A. first and second capstans;
      B. a first pinch roller moveable between a first position wherein said first pinch roller is out of operative engagement with said first capstan and a second position wherein said first pinch roller is in operative engagement with said first capstan;
      C. first receiving means for selectively receiving a compact cassette or an adaptor, said first receiving means adapted to position a tape contained in a compact cassette between said first capstan and said first pinch roller when a compact cassette is placed in said first receiving means;
   2. said adaptor comprising:
      A. a second pinch roller moveable between a third position wherein said second pinch roller is out of operational engagement with said second capstan when said adaptor is placed in said first receiver means and a fourth position wherein said second pinch roller is in operational engagement with said second capstan when said adaptor is placed in said first receiver means;
      B. second receiver means for receiving a micro-cassette and for positioning a tape contained in said micro-cassette between said second pinch roller and said second capstan when a micro-cassette is placed in said second receiver means;
      C. means coupling said first pinch roller to said second pinch roller when said adaptor is placed in said first receiver means, said coupling means for moving said second pinch roller into said fourth position in response to movement of said first pinch roller towards said second position.

2. A dual cassette tape recorder according to claim 1, further comprising means for rotating said first and second capstans.

3. A dual cassette tape recorder according to claim 1, wherein said coupling means comprises:
   an interlocking lever responsive to movement of said first pinch roller and pivotable between a fifth position when said first pinch roller is in said first position and a sixth position when said first pinch roller is moved toward said second position; and
   lever means coupling said interlocking lever to said second pitch roller for positioning said second pinch roller in said third position when said interlocking lever is in said fifth position and for positioning said second pinch roller in said fourth position when said interlocking lever is in said sixth position.

4. A dual cassette tape recorder according to claim 3 further including means for positioning said pinch roller in said first position when said recorder is not in a recording or playback mode of operation and for moving said first pinch roller toward said second position when said recorder is placed in a recording or playback mode of operation.

5. A dual cassette tape recorder according to claim 4 wherein said lever means comprises:
   a slide coupled to said interlocking lever and slideable along a path generally transverse to the movement of a tape within a micro-cassette as said tape passes between second pinch roller and said second capstan; and a rocker arm upon which said second pinch roller is mounted, said rocker arm being pivotable along an arc which permits said second pinch roller to move in a direction generally transverse to said tape movement, a free end of said rocker arm being in operational engagement with said slide.

6. A dual cassette tape recorder according to claim 5 further including spring means urging said free end of said rocker arm toward said slide.

7. A dual cassette tape recorder according to claim 6, further including means for adjusting the force with which said spring means urges said free end of said rocker arm toward said slide.

8. A dual cassette tape recorder according to claim 7 wherein said spring means is a coil spring and wherein said adjusting means includes a sawtooth edge on said rocker arm, each tooth of said edge being a different distance from the point around which said rocker arm pivots whereby the force with which said spring urges said free end of said rocker arm toward said slide may be adjusted by connecting said coil spring between desired ones of said teeth.

9. A dual cassette tape recorder according to claim 3 wherein said interlocking lever is provided with a roller which bears against said first pinch roller.

10. A dual cassette tape recorder comprising:
first and second capstans;
a first pinch roller moveable between a first position wherein said first pinch roller is out of operative engagement with said first capstan and a second position wherein said first pinch roller is in operative engagement with said first capstan;
a second pinch roller moveable between a third position wherein said second pinch roller is out of operative engagement with said second capstan and a fourth position wherein said second pinch roller is in operative engagement with said second capstan;
means for selectively receiving a compact cassette or a micro-cassette, said receiving means adapted to position a tape contained in a compact cassette between said first capstan and said first pinch roller when a compact cassette is placed in said receiving means, and adapted to position a tape contained in a micro-cassette between said second capstan and said second pinch roller when a micro-cassette is placed in said receiving means;
means for moving said first pinch roller into said second position when a compact cassette is placed in said receiving means and said tape recorder is set in a recording or playback mode and for moving said second pinch roller into said fourth position when a micro-cassette is placed in said receiving means and said tape recorder is set in recording or playback mode.

11. A dual cassette tape recorder according to claim 10 wherein said means for moving said first pinch roller comprises:
second means for moving said first pinch roller from said first position toward said second position when said tape recorder is set for a record or playback operation;
means engaging said first pinch roller when a micro-cassette is positioned in said receiving means, said engaging means to position said second pinch roller in said third position when said first pinch roller is in said first position and to move said second pinch roller into said fourth position in response to movement of said first pinch roller toward said second position.

12. A dual cassette tape recorder according to claim 11, wherein said engaging means includes means for preventing said first pinch roller from obtaining said second position when a micro-cassette is placed in said receiving means.

13. A dual cassette tape recorder according to claim 11 wherein said engaging means comprises:
an interlocking lever responsive to movement of said first pinch roller and pivotable between a fifth position when said first pinch roller is in said first position and a sixth position when said first pinch roller is moved toward said second position;
lever means coupling said interlocking lever to said second pinch roller for positioning said second pinch roller in said third position when said interlocking lever is in said fifth position and for positioning said second pinch roller in said fourth position when said interlocking lever is in said sixth position.

14. A dual cassette tape recorder according to claim 13 including means for positioning said first pinch roller in said first position when said recorder is not in a recording or playback mode of operation and for moving said first pinch roller toward said second position when said recorder is placed in a recording or playback mode of operation.

15. A dual cassette tape recorder according to claim 14 wherein said lever means comprises:
a slide coupled to said interlocking lever and slideable along a path generally transverse to the movement of a tape within a micro-cassette as said tape passes between said second pinch roller and said second capstan; and
a rocker arm upon which said second pinch roller is mounted, said rocker arm being pivotably along an arc which permits said second pinch roller to move in a direction generally transverse to said tape movement, a free end of said rocker arm being in operational engagement with said slide.

16. A dual cassette tape recorder in accordance with claim 15 further including spring means urging said free end of said rocker arm toward said slide.

17. A dual cassette tape recorder according to claim 16 including means for adjusting the force with which said spring means urges said free end of said rocker arm toward said slide.

18. A dual cassette tape recorder according to claim 17 wherein said spring means is a coil spring and wherein said adjusting means includes a sawtooth edge on said rocker arm, each tooth of said edge being a different distance from the point around which said rocker pivots whereby the force with which said spring urges said free end of said rocker arm toward said slide may be adjusted by connecting said coil spring between desired ones of said teeth.

19. A dual cassette tape recorder according to claim 14 wherein said interlocking lever is provided with roller which bears against said first pinch roller.

20. A dual cassette tape recorder according to claim 10 further comprises means for rotating said first and second capstans.

* * * * *